(12) United States Patent
Esque et al.

(10) Patent No.: US 7,076,235 B2
(45) Date of Patent: Jul. 11, 2006

(54) AUTOMATIC NOTIFICATION OF PERSONAL EMERGENCY CONTACTS FROM A WIRELESS COMMUNICATIONS DEVICE

(75) Inventors: Brian Esque, Cary, NC (US); Ray Derler, Ballwin, MO (US); Ashley J. Swartz, Lewisberry, PA (US); Roger Osborn, Raleigh, NC (US)

(73) Assignee: Sony Ericsson Mobile Communications AB (SE)

( * ) Notice: Subject to any disclaimer, the term of this patent is extended or adjusted under 35 U.S.C. 154(b) by 414 days.

(21) Appl. No.: 10/308,781

(22) Filed: Dec. 3, 2002

(65) Prior Publication Data

US 2004/0203622 A1    Oct. 14, 2004

(51) Int. Cl.
*A04B 1/38* (2006.01)
(52) U.S. Cl. .................................... 455/404.1
(58) Field of Classification Search ............. 455/404.1, 455/521
See application file for complete search history.

(56) References Cited

U.S. PATENT DOCUMENTS

| | | | |
|---|---|---|---|
| 4,371,751 A | 2/1983 | Hilligoss, Jr. et al. | |
| 5,742,666 A | 4/1998 | Alpert | |
| 5,805,670 A | 9/1998 | Pons et al. | |
| 5,878,351 A | 3/1999 | Alanara et al. | |
| 6,073,004 A | 6/2000 | Balachandran | |
| 6,097,961 A | 8/2000 | Alanara et al. | |
| 6,104,799 A | 8/2000 | Jain et al. | |
| 6,201,856 B1 | 3/2001 | Orwick et al. | |
| 6,256,489 B1 | 7/2001 | Lichter et al. | |
| 6,301,484 B1 | 10/2001 | Rogers et al. | |
| 6,397,054 B1 | 5/2002 | Hoirup et al. | |
| 6,678,358 B1 * | 1/2004 | Langsenkamp et al. | 379/69 |
| 2002/0042846 A1 | 4/2002 | Bottan et al. | |
| 2002/0072348 A1 | 6/2002 | Wheeler et al. | |
| 2002/0087704 A1 | 7/2002 | Chesnais et al. | |
| 2002/0116499 A1 | 8/2002 | Enns et al. | |
| 2002/0116524 A1 | 8/2002 | Anson et al. | |
| 2002/0137489 A1 * | 9/2002 | Dutta et al. | 455/404 |
| 2002/0160757 A1 | 10/2002 | Shavit et al. | |
| 2004/0152441 A1 * | 8/2004 | Wong | 455/404.1 |
| 2004/0198315 A1 * | 10/2004 | Vellotti | 455/404.1 |
| 2004/0203563 A1 * | 10/2004 | Menard | 455/404.1 |

* cited by examiner

FOREIGN PATENT DOCUMENTS

WO    WO 02/078226    10/2002

OTHER PUBLICATIONS

'PCT Notification of Transmittal of the International Search Report or the Declaration' dated Jun. 16, 2004.

*Primary Examiner*—Creighton Smith
(74) *Attorney, Agent, or Firm*—Coats & Bennett P.L.L.C.

(57) ABSTRACT

A wireless communication device notifies designated contacts of an emergency using contact information stored in the wireless communication device. The contact information includes, but is not limited to, a list of designated contacts, at least one individual notification message for each designated contact, and delivery information for each notification message. The wireless communication device, responsive to an emergency input, automatically retrieves the contact information from memory and sends individual notification messages to each designated contact according to the contact information. Because the wireless communication device stores all instructions and information related to the emergency notification function in memory within the wireless communication device, the wireless communication device is compatible with any wireless network capable of transmitting messages generated by the wireless communication device.

38 Claims, 6 Drawing Sheets

AUTOMATIC NOTIFICATION OF PERSONAL EMERGENCY CONTACTS FROM A WIRELESS COMMUNICATIONS DEVICE

FIELD OF THE INVENTION

The present invention relates to a method and apparatus for automatically notifying personal emergency contacts of an emergency, and more particularly for notifying personal emergency contacts of an emergency using a wireless communications device in response to an emergency.

BACKGROUND OF THE INVENTION

Current emergency services provide emergency response from standard emergency personnel, such as policemen, firemen, EMTs, etc. An individual in distress traditionally requests assistance from one or more of these emergency personnel by dialing 911 on a standard telephone and reporting the emergency to an emergency operator. The emergency operator then dispatches the appropriate emergency personnel to the distressed individual's location.

The increased popularity of wireless technology prompted emergency services personnel to work with wireless technology providers to develop a 911 system compatible with the landline 911 system. The resulting E911 service essentially provides the same emergency services as the landline equivalent. As with landline emergency services, E911 enables a user to notify emergency officials of an emergency.

In some instances, it is critical that specific individuals be aware of an emergency. For example, a person may want to be notified when a spouse or child has called 911. These individuals may provide critical information, such as consent to medical treatment, allergy information, and medication history to health care officials.

One simple solution to the above problem is for an individual in distress to notify emergency contacts by placing separate calls to each emergency contact. This solution is highly undesirable for many reasons. First, a user may be unconscious or otherwise unavailable to place multiple calls to individual or personal emergency contacts. Even if a user is available to make emergency calls, a user may simply forget to notify individual or personal emergency contacts due to the stress and shock associated with the emergency. Further, a user may have to use multiple avenues of communication, such as telephone, email, pager, etc., to contact one or more emergency contacts, which further compounds the stress and anxiety of the user.

Various technologies currently exist that enable a user to automatically notify particular individuals of an emergency. U.S. Pat. No. 5,742,666 to Alpert discloses a system wherein a cellular telephone automatically dials the phone number of one or more predefined emergency contacts in the event of an emergency. A pre-recorded message is played to each emergency contact. Alternatively, the user may participate in the emergency communication with an emergency contact upon receiving notification that the cellular telephone has successfully made a connection with the emergency contact. This invention is limited to sequentially sending a single pre-recorded audio message to multiple emergency contacts.

U.S. Pat. No. 5,805,670 to Pons et al. discloses a private notification system that communicates 911 information to pre-selected recipients identified by the user. This information may include location, telephone number, and any other information provided to the emergency systems operator. The system may use wireless, facsimile, and public data networks to transmit emergency information, such as location of emergency, destination hospital, etc., to emergency contacts. In response to a 911 signal, a command control center notifies predetermined emergency contacts and sends information generated by the 911 communication to the emergency contacts. This invention is limited to sending a single message to multiple emergency contacts. Further, implementation of this notification system requires modifications to the network.

U.S. Patent Application Publication 2002/0042846 A1 to Bottan et al. discloses a system that notifies multiple contacts of an emergency according to predefined instructions. Upon receiving a predetermined input, a cellular telephone sends an event signal to the wireless network to activate an automatic notification system. This system is applicable to predefined communications as well as emergency communications. The network may send a pre-stored message to various contacts through email, facsimile, telephone, etc. However, implementation of this notification system requires modifications to the wireless network.

The above patents and published application disclose various methods for automatically notifying emergency contacts. However, they do not enable delivery of multiple user-defined messages via multiple delivery methods to multiple emergency contacts without modification of the wireless network.

SUMMARY OF THE INVENTION

The present invention comprises a method and apparatus for sending emergency notification messages via multiple delivery methods to designated personal emergency contacts using a wireless communication device. The wireless communication device stores contact information related to emergency notification. The contact information includes, but is not limited to, a list of designated emergency contacts, at least one individual notification message for each designated emergency contact, and delivery information for each notification message. The wireless communication device, responsive to an emergency input, retrieves the contact information from memory and sends personal notification messages to the designated contacts using the specified delivery methods. Different messages may be sent to different contacts and multiple messages may be sent to a single contact using multiple delivery methods. Further, different messages may be sent to the same contact using different delivery methods.

The wireless communication device stores the emergency notification function software as well as all instructions and information related to the emergency notification function. Therefore, implementation of the present invention does not require any modifications to the wireless network. A wireless network simply transmits the notification messages as it would any other messages generated by the wireless communication device.

DETAILED DESCRIPTION OF THE INVENTION

Figure 1:
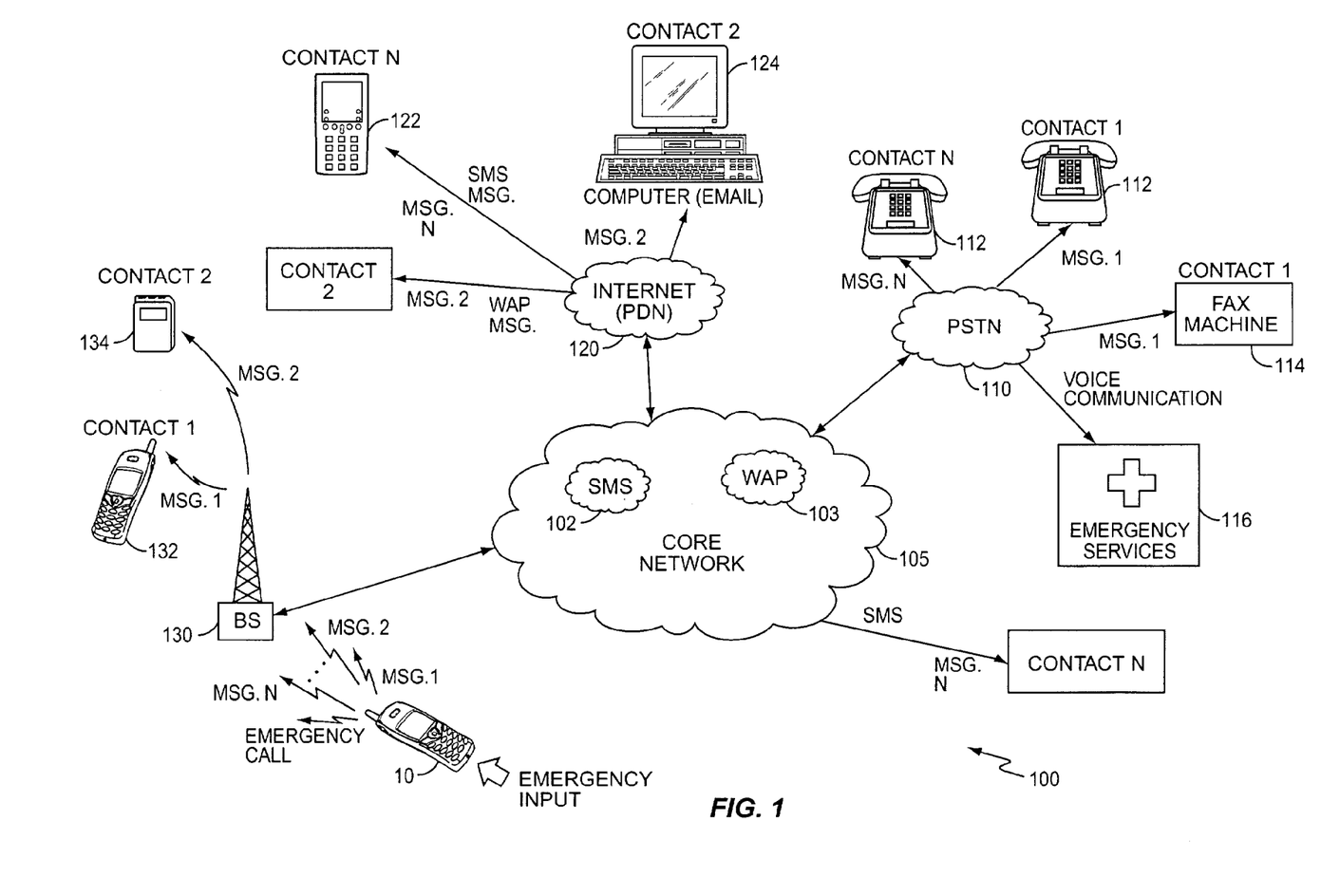
FIG. 1 illustrates a conventional wireless network as used by the present invention.

FIG. 1 illustrates a wireless communication device 10, according to the present invention, operating within a wireless network 100. The wireless network 100 may implement any one of a variety of communication standards, including without limitation, the standards known as the Global System for Mobile Communications (GSM), TIA/EIA-136, IS-95, cdma2000, and Wideband Code Division Multiple Access (WCDMA). New standards are likely to evolve in the future and the enumeration of particular standards herein is not intended to be limiting.

Regardless of the particular standard, the wireless network 100 typically includes a plurality of base stations 130 that connect to a core network 105. Each base station serves a geographic region commonly referred to as a cell. The base stations 130 communicate with wireless communication devices 10 and 132 within their respective cells. Device 132 may or may not include the automatic notification feature of the present invention. The core network 105 connects to the Public Switched Telephone Network (PSTN) 110 and to external Packet Data Networks (PDNs) 120, such as the Internet. The core network 105 routes mobile call traffic between the appropriate base station 130 and the PSTN 110. Thus, the wireless communication device 10 can communicate with landline telephones 112 and facsimile machines 114. The wireless communication device 10 served by the base stations 130 can also communicate with emergency response centers 116, such as a 911 operator via the PSTN 110. Similarly, the core network 105 routes packet data traffic between the appropriate base station 130 and the Internet or other PDN 120. Thus, the wireless communication device 10 served by the base stations 130 may also communicate with computers 124 and other devices 122 connected to the Internet.

The core network 105 may include communication servers, such as a Short Messaging Service (SMS) servers 102 and/or Wireless Application Protocol (WAP) servers 103. These servers may provide a variety of teleservices and data services to wireless communication devices.

SMS allows wireless communication devices 10 and 132 to send and receive short text messages. Messages originating from, or terminating at, a wireless communication device 10 in the network 100 are stored in a message center 102 within the core network 105. The message center 102 is a store-and-forward device or system that is used to support teleservices like cellular messaging. The typical interfaces to the message center 102 allow direct dial-in access, computer interface for e-mail delivery to phones, or human operator input for paging services. Mobile-originated SMS messages are initially forwarded to the message service center 102 where the SMS message is stored until the message can be delivered. If the intended recipient is another wireless communication device, e.g., device 10 or 132, a mobile switching center (MSC) in the core network 105 searches for the targeted wireless communication device 132 and alerts the targeted wireless communication device 132 that a message is coming. The targeted wireless communication device 132 tunes to a designated messaging channel (typically a SDCCH channel) where it waits for the SMS message. The MSC (not shown) then forwards the SMS message to the targeted wireless communication device 132 on the designated channel and waits for an acknowledgement from the targeted wireless communication device 132 confirming receipt of the message. If an acknowledgement is received from the targeted wireless communication device 132 the message is removed from storage. If receipt of the message is not acknowledged, the MSC may attempt to deliver the message again.

WAP is a universally accepted standard for providing Internet communications and advanced telephony services to digital wireless communication devices. A wireless communication device compatible with WAP uses a microbrowser to communicate with WAP servers 103 that make applications and content accessible to the wireless communication devices 10 and 132. The services available to WAP enabled wireless communication devices 10 and 132 are wide-ranging and constantly expanding as a result of the open nature WAP. WAP is aimed at providing the same services to wireless communication devices 10 and 132 that are common in fixed computers 124 with Internet connections. Thus, WAP allows users of wireless communication devices 10 and 132 to browse the web, send and receive e-mails, receive stock prices, news, and weather information. Pertinent to the present invention, WAP can be used to send emergency notifications to designated users as conventional e-mail messages and instant messages.

The present invention takes advantage of existing services in the wireless network 100, such as SMS and WAP services, to notify individuals designated by the wireless communication device user of an emergency. As illustrated in FIG. 1, when a wireless communication device 10 receives an emergency input, the wireless communication device 10 automatically transmits notification messages to designated individuals. In addition, the wireless communication device 10 may contact conventional emergency services 116. Each individual may receive a different notification message, which may be delivered through a plurality of different delivery methods, such as voice, e-mail, facsimile, etc. Further, each individual may receive more than one notification message via different delivery methods. The present invention does not require any modification of the wireless network 100, but instead takes advantage of services already prevalent in existing wireless networks 100. Indeed, one advantage of the present invention is that the wireless network 100 handles the emergency notification messages in the same manner as other messages using the same services. Therefore, the wireless network 100 need not be aware that it is delivering emergency notification messages. The emergency notification messages are transported transparently through the wireless network 100 to the final designated recipients.

The invention is illustrated by the following example. A user dials 911 to communicate an emergency to the emergency response center 116. After completing the 911 call, the wireless communication device 10 also sends predetermined notification messages, designated as messages 1–N in FIG. 1, to predetermined emergency contacts to notify the designated contacts of the emergency. The designated contacts may be stored, for example, as a list in memory. Message 1 may be sent to contact 1 via facsimile, a cellular telephone call, and a landline telephone call. Message 2 may be sent to contact 2 via e-mail, WAP, and a paging system. Because the automatic notification functionality is completely contained within the wireless communication device 10, no wireless network 100 modifications are required to implement the emergency notification function. In fact, the wireless network 100 merely acts as a conduit for transferring the messages from point A to point B.

It should be noted that the present invention is not limited to 911 emergency inputs. The user may also enter a personal emergency code to activate the emergency contact function. Alternatively, an external device may generate the emergency input. For example, an automobile control system may generate the emergency input in response to the deployment of the automobile's air bags. This externally generated input is delivered to the wireless communication device 10 via an external input port.

Figure 2:
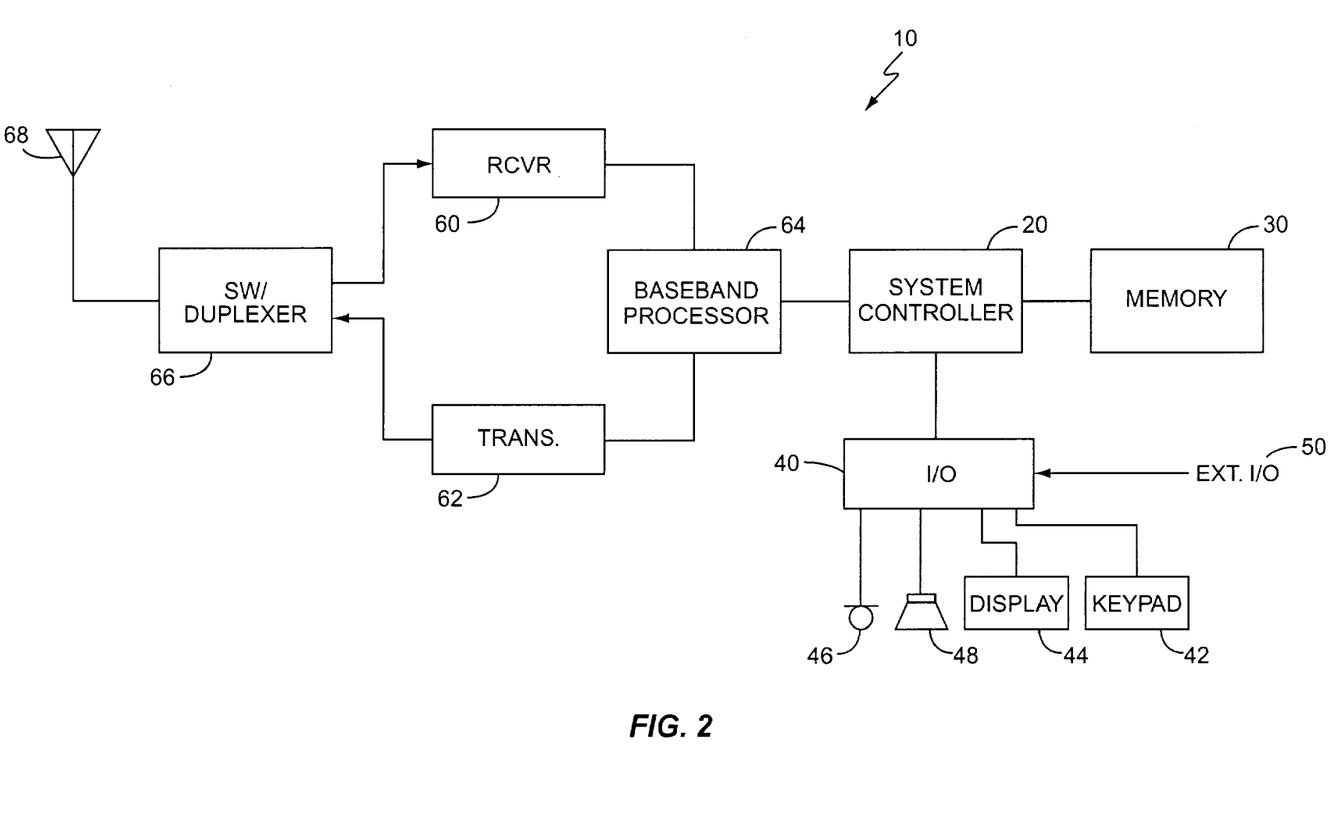
FIG. 2 illustrates a block diagram of the wireless communication device.

FIG. 2 is a block diagram of a typical wireless communication device 10 according to the present invention. The disclosed embodiment of the wireless communication device 10 is a fully functional cellular telephone capable of transmitting and receiving analog and/or digital signals over an RF channel. It should be noted that while the present discussion focuses on a cellular telephone for clarity, the present invention is not so limited. Indeed, the present invention is applicable to a wide variety of wireless communication devices 10 and 132, such as PDAs 122, pagers 134, laptop computers, and the like (FIG. 1).

The wireless communication device 10 includes a system controller 20 for controlling the operation of the wireless communication device 10 and memory 30 for storing control programs and data used by the wireless communication device 10 during operation. Input/output circuits 40 interface the system controller 20 with a keypad 42, display 44, microphone 46, speaker 48, and an external input port 50. Input port 50 may also include an output port. The keypad 42 allows the user to dial numbers, enter commands, type messages, and select menu options. The display 44 allows the user to see dialed digits, stored information, and call status information. The external input/output 50 allows the wireless communication device 10 to receive external input, such as power, data, and emergency signals. The receiver 60 and transmitter 62, connected to the system controller 20 via the baseband processor 64, receive and transmit communication signals via duplexer 66 using shared antenna 68.

According to the present invention, memory 30 stores contact information, including a list of designated contacts to be notified in case of an emergency, an individual notification message for each designated contact, one or more delivery. methods, and notification features. Further, the contact information may include a separate notification message for each delivery method corresponding to each designated contact. In addition, memory 30 stores the software for implementing the emergency notification function.

Figure 3:
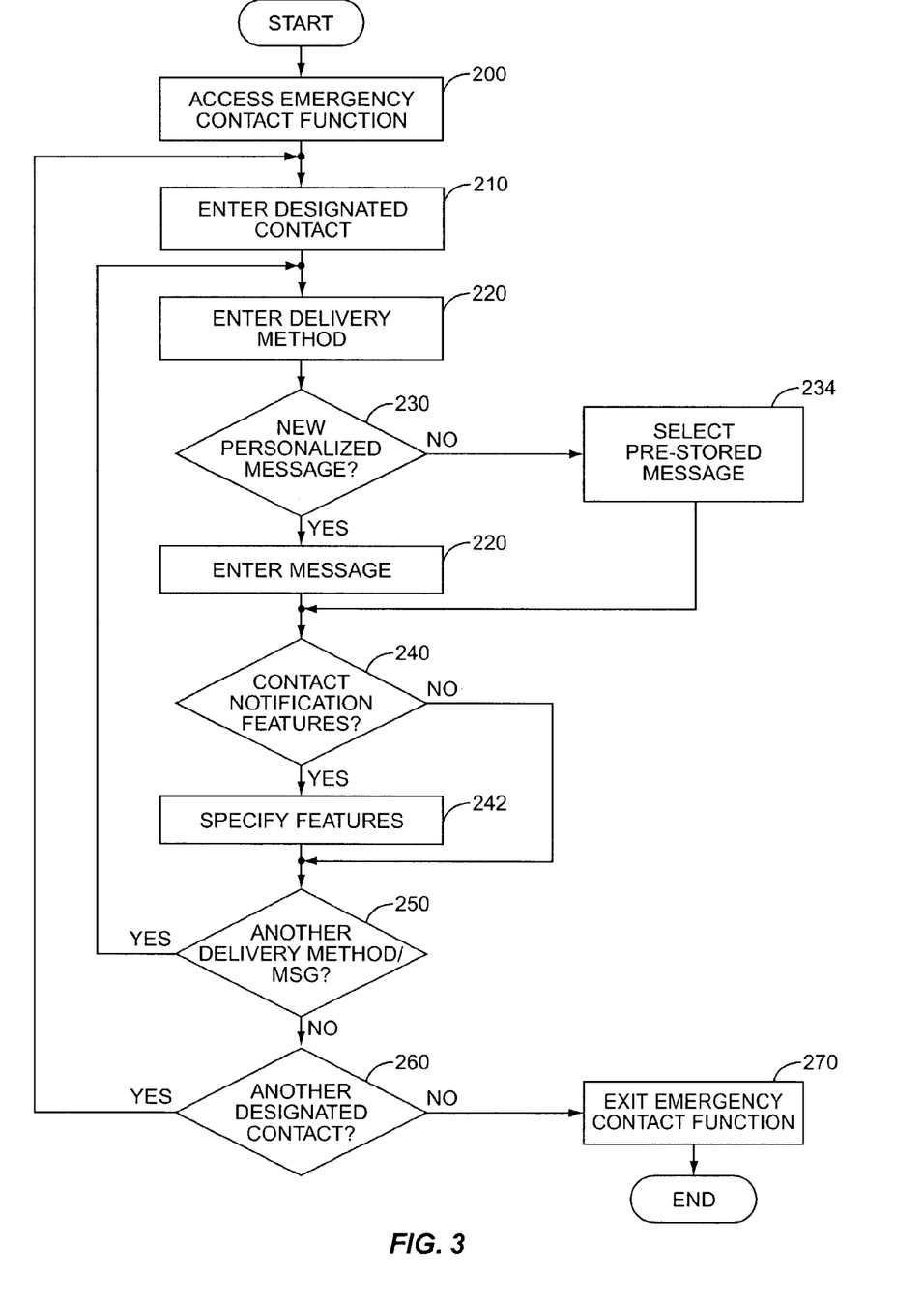
FIG. 3 illustrates the process diagram for storing emergency contact information.

FIG. 3 illustrates an exemplary procedure for storing contact information. After the user accesses the emergency contact function (200) on their wireless communication device 10, the wireless communication device 10 prompts the user to enter a designated contact (210). The user may select a contact already stored in the wireless communication device's 10 address book or the user may enter a new contact. After the user enters a designated contact, the wireless communication device 10 may then display a scroll down list of delivery options, such as e-mail, telephone, page, facsimile, etc. A user selects the desired delivery method (220) and then enters any necessary delivery method information (220) to the wireless communication device 10, such as an e-mail address, telephone number, pager number, facsimile number, etc.

Once the user enters a designated contact and a delivery method (210, 220), the wireless communication device 10 provides the user with the option (230) to either use a pre-recorded notification message (234), or to enter a new notification message (220). Typically, the notification message is entered into the wireless communication device 10 in a format compatible with the specified delivery method.

The wireless communication device 10 then provides the user with the option (240) to associate notification features with the designated contact (242). Such features may include priority indication, send confirmation, message editing capabilities, etc. For example, the contact information may include data indicating the priority level of a message, i.e., the message should be sent before any other messages are sent. The contact information may further include data indicating whether the user should be prompted to confirm and/or edit a particular message corresponding to a specific contact before sending the message. It should be noted that the present invention is not limited to the above list of notification options, and that the enumeration of options is intended merely to illustrate the flexibility with which notification messages can be sent.

After notification options (if any) are entered by the user, the wireless communication device 10 prompts the user (250) for another delivery method and/or message for the current contact. The process of entering a delivery method and corresponding message (220–250) repeats until the user indicates that no more delivery methods and/or messages are required. Once the user has entered all data corresponding to a designated contact, the wireless communication device 10 prompts the user for another designated contact (260). This process (210–260) repeats until the user has entered all desired emergency contact information and exits the emergency contact function (270). It should be noted that the present invention is not limited to the above sequence of steps. Those skilled in the art will recognize that the above steps, or any additional steps, may be executed in a different order without departing from the scope of the disclosed invention.

The data remains stored in memory 30 of the wireless communication device 10 until the system controller 20 receives an emergency input. Upon receipt of an emergency input, the system controller 20 retrieves the contact information and causes the notification messages to be transmitted by the transmitter 62.

Figure 4:
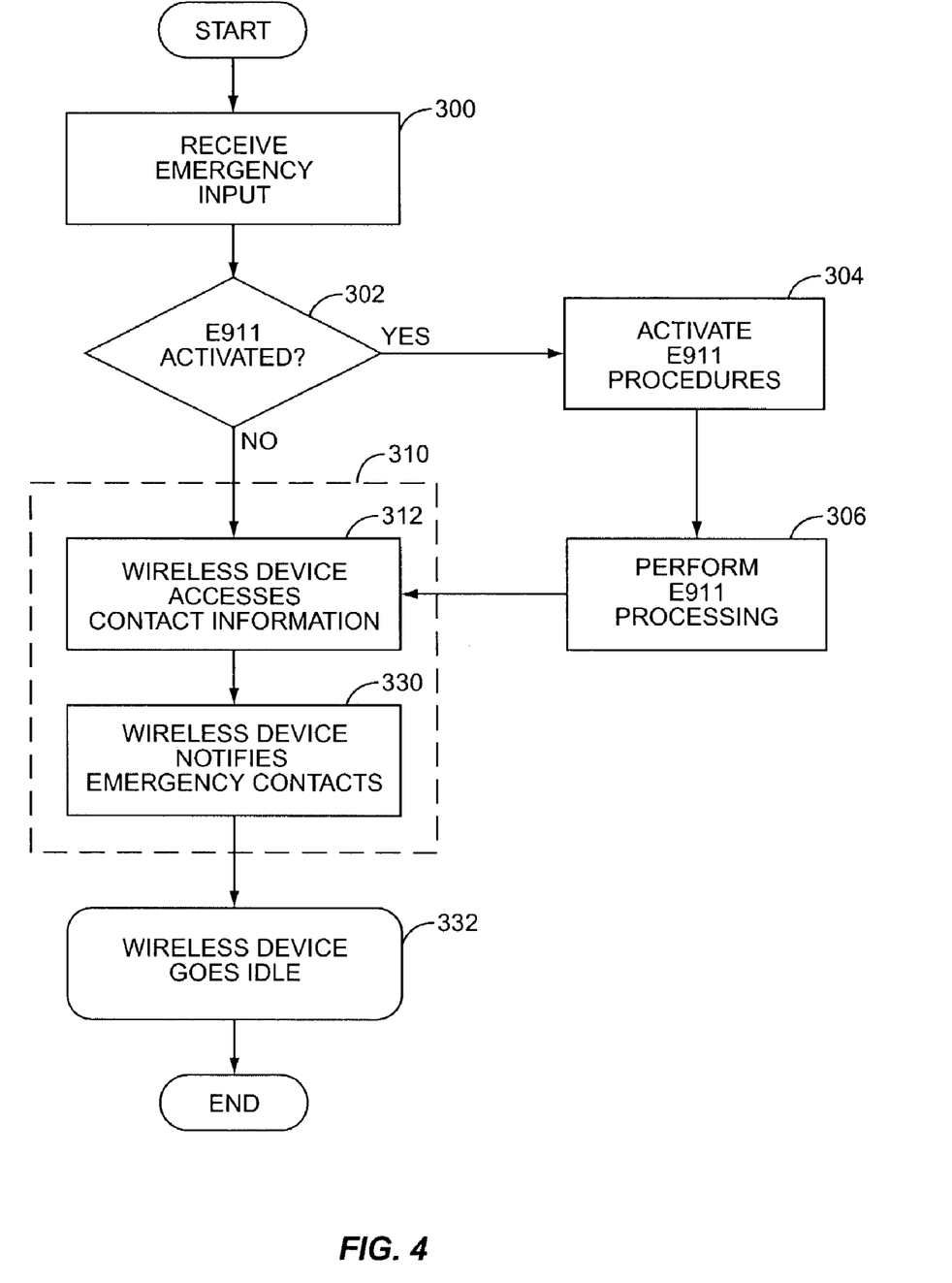
FIG. 4 illustrates the process diagram for implementing the emergency function of the present invention.

FIG. 4 illustrates the operation of one exemplary embodiment of the present invention. After the wireless communication device 10 receives the emergency input (300), the system controller determines if the emergency input activates E911 services (302). If the emergency input activates E911 services, the wireless communication device 10 activates the E911 procedures (304) according to the Federal Communications Commission (FCC) requirements. These requirements are not critical to the present invention, and therefore, will not be discussed in detail. Generally, upon activation of E911, the wireless communication device 10 contacts emergency services, enabling communication to commence between the user and emergency services personnel. In addition to the voice communications provided by the user, the wireless communication device 10 may also provide the telephone number and the location information to the emergency services personnel. The telephone number and location information may also be appended to any pre-stored messages to the designated contacts. Once the emergency call is complete, the wireless communication device 10 completes the required E911 post-call processing (306).

Figure 5:
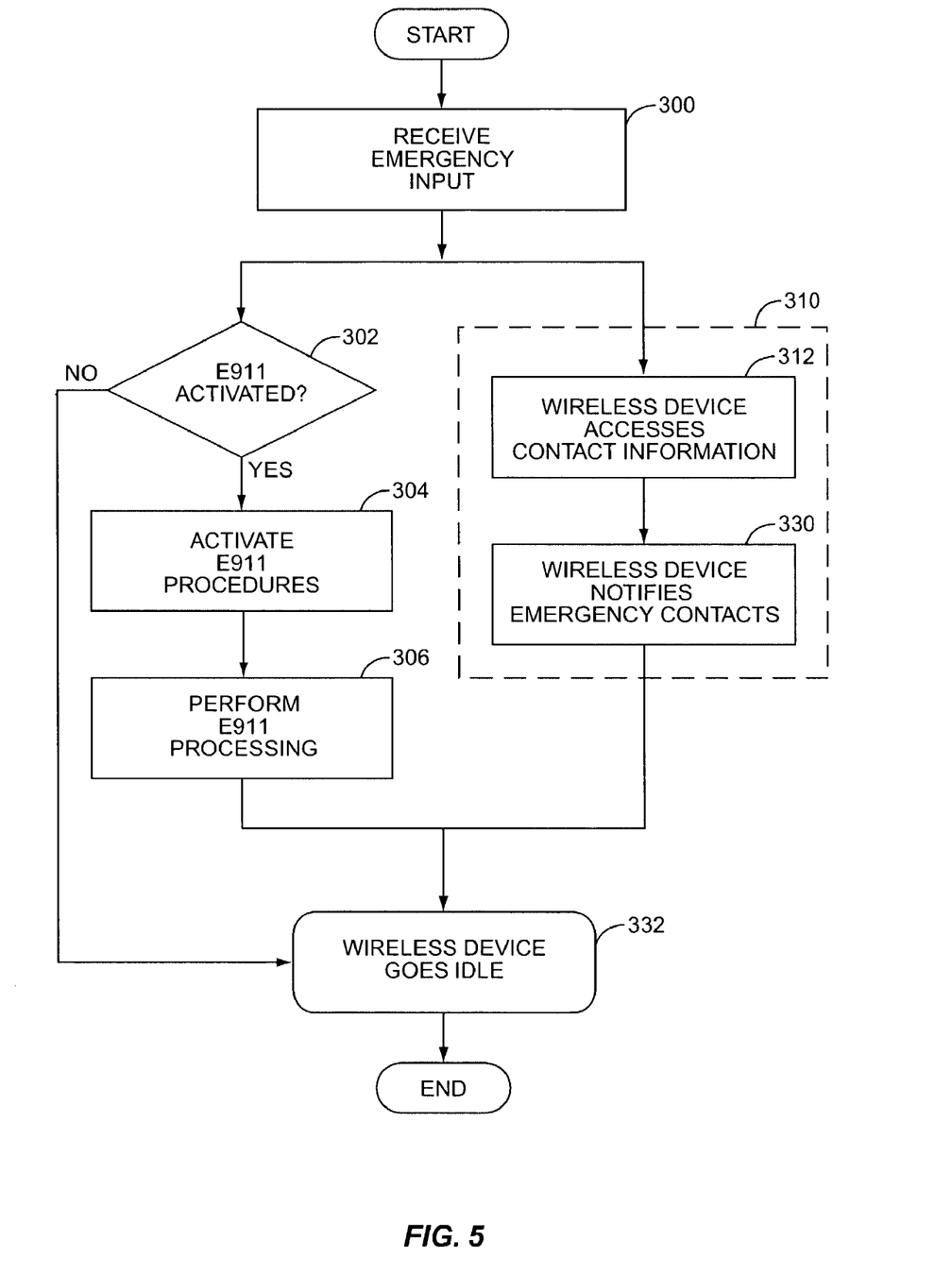
FIG. 5 illustrates another process diagram for implementing the emergency function of the present invention.

After all E911 requirements have been met, the wireless communication device 10 implements the emergency contact function (310). Implementing the emergency contact function (310) includes automatically accessing the contact information (312) stored in memory and notifying the designated contacts (330) according to the stored contact information. Alternatively, as shown in FIG. 5, the wireless communication device 10 may access the stored contact information (312) and notify the designated contacts (330) according to the stored contact information concurrently with placing the E911 call (304, 306). In either embodiment, the wireless communication device 10 automatically accesses the stored contact information (312) and notifies the designated contacts (330) according to the stored contact information.

Figure 6:
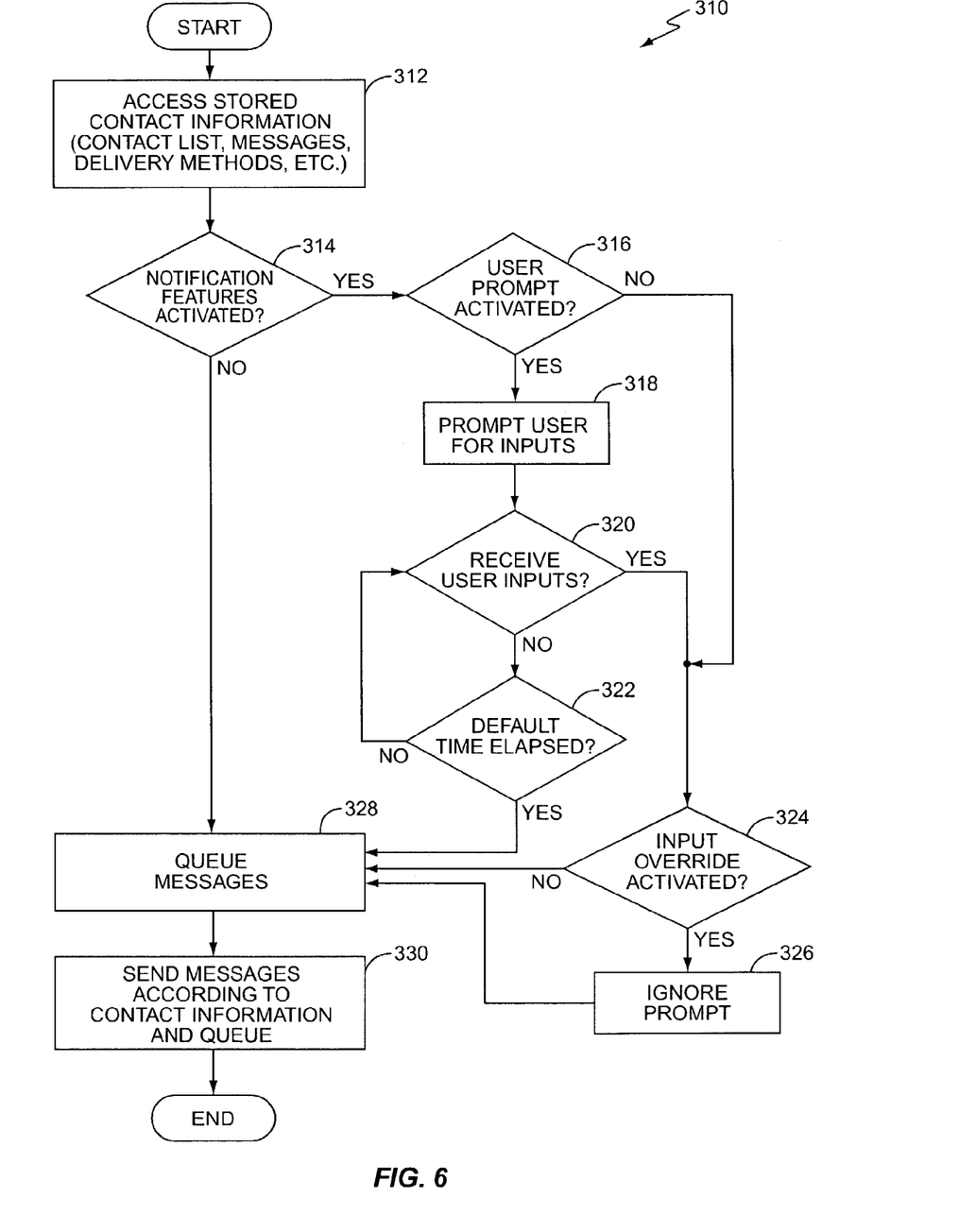
FIG. 6 illustrates another process diagram for implementing the emergency function of the present invention.

FIG. 6 illustrates exemplary emergency contact function steps (310) in further detail. The wireless communication device 10 accesses the contact information (312) stored in memory 30 in response to an emergency input. The system controller 20 determines if the user stored any notification features (314). If the user did not store any notification features for any messages, the wireless communication device 10 queues the messages (328) and sends the messages to the designated contacts according to the contact information (330).

If the user stored one or more notification features, the system controller determines if one or more notification features require user input (316). If one or more notification features require user input, the wireless communication device 10 prompts the user (318) for the required information. The wireless communication device 10 then waits a predetermined wait period (322) for a user input. If the wireless communication device 10 does not receive any user inputs before the wait period expires, the wireless communication device 10 may queue (328) and send the messages (330) according to the stored contact information. Alternatively, the wireless communication device 10 may skip any message(s) requiring user input and send the remaining messages (not shown).

If the wireless communication device 10 receives user input before the wait period expires (320), the system controller 20 determines if an input override is active (324) for a particular message. Input override prevents a user from averting some or all of the notification messages. When input override is active, all user inputs are ignored, the message is put in the queue (328), and the message is sent (330) to the designated contact. Alternatively, when input override is active, only user inputs regarding transmission are ignored; all other messages are queued (328) and sent (330) according to the contact information. When this flag is not active, the system controller 20 queues the message (328) and sends the message (330) to the designated contact. It should be noted that implementing the emergency notification function is not limited to the above sequence of steps. Those skilled in the art will recognize that the above steps, or any additional steps, may be executed in a different order without departing from the scope of the disclosed invention.

The foregoing description and drawings describe and illustrate the present invention in detail. However, the foregoing disclosure only describes some embodiments. Those skilled in the art will understand that the present invention is not limited to cellular telephones, particular network implementations, or the specified features. Therefore, the present invention embraces all changes and modifications that come within the meaning and equivalency range of the appended claims.

What is claimed is:

1. A method of notifying designated emergency contacts using a wireless communication device, the method comprising:

storing contact information for one or more designated contacts in a memory of said wireless communication device;

selectively assigning and storing an individual notification message for each designated contact in said memory;

storing a priority indicator for each of said designated contacts in said memory; and responsive to said wireless communication device receiving an emergency input, sending said notification messages as specified by said contact information from said wireless communication device to said designated contacts in an order determined by the priority indicators.

2. The method of claim 1, wherein storing contact information for one or more designated contacts comprises storing delivery information for each said designated contact.

3. The method of claim 2, wherein storing delivery information for each said designated contact comprises storing one or more delivery methods for each said designated contact.

4. The method of claim 3, wherein selectively assigning and storing said individual notification message and storing said one or more delivery methods comprises storing a separate individual notification message for each of said one or more delivery methods corresponding to each said designated contact.

5. The method of claim 3, wherein storing one or more delivery methods comprises storing at least one of a telephone number, an e-mail address, and a computer network address.

6. The method of claim 5, wherein sending said notification messages comprises sending each said notification message according to the one or more delivery methods specified by the corresponding contact information for that notification message.

7. The method of claim 5, wherein storing one or more delivery methods comprises storing one or more indicators corresponding to at least one of SMS messaging, WAP messaging, and e-mail messaging.

8. The method of claim 5, wherein sending said notification messages comprises forming a message queue for each delivery method and sending said notification messages from each message queue.

9. The method of claim 1 wherein sending each said notification message to each said designated contact comprises sequentially sending each said notification message to said designated contact in the order determined by the priority indicators.

10. The method of claim 1, wherein storing said notification message further comprises accepting user input to define said notification message and to associate said notification message with a designated contact.

11. The method of claim 1, wherein sending said notification messages further comprises prompting a user, according to said contact information, for additional information.

12. The method of claim 11 further comprising sending said notification messages if said user does not provide said additional information during a predetermined wait period.

13. The method of claim 11 further comprising deferring sending said notification messages if said user does not provide said additional information during a predetermined wait period.

14. The method of claim 11, wherein prompting said user comprises prompting said user for a notification priority for each said designated contact.

15. The method of claim 11, wherein prompting said user comprises prompting said user to edit at least one of said notification messages before sending said notification messages.

16. The method of claim 11, wherein prompting said user comprises prompting said user for confirmation before sending at least one of said notification messages.

17. The method of claim 1, wherein receiving said emergency input comprises receiving an emergency signal when a user dials 911.

18. The method of claim 1, wherein receiving an emergency input comprises receiving an emergency signal when a user dials a personal emergency code.

19. The method of claim 1, wherein receiving an emergency input comprises receiving an externally generated signal through an input port on said wireless communication device.

20. The method of claim 1 further comprising deferring sending said notification messages until an emergency call to emergency personnel is completed.

21. The method of claim 1 further comprising sending said notification messages concurrent with placing an said-emergency call to emergency personnel.

22. A wireless communication device for notifying designated emergency contacts comprising:
 a memory for storing contact information for one or more designated contacts and an individual notification message for each said designated contact selectively assigned by the user, and for storing a priority indicator for each of said designated contacts; and
 a transmitter for sending said notification messages as specified by said contact information to said designated contacts in an order determined by said priority indicators responsive to said wireless communication device receiving an emergency input.

23. The wireless communication device of claim 22, wherein said memory further includes delivery information specified by said contact information for each said notification message corresponding to each said designated contact.

24. The wireless communication device of claim 23 wherein said delivery information stored in said memory comprises one or more delivery methods for each said notification message.

25. The wireless communication device of claim 24, wherein said one or more delivery methods stored in said memory comprises at least one of a telephone number, an e-mail address, and a computer network address.

26. The wireless communication device of claim 25, wherein said transmitter sends said notification messages according to the one or more delivery methods.

27. The wireless communication device of claim 25, wherein said one or more delivery methods comprises one or more indicators corresponding to at least one of SMS messaging, WAP messaging, and e-mail messaging.

28. The wireless communication device of claim 25 further comprising a processor for forming a message queue for each delivery method, wherein said transmitter sends said notification messages from each message queue.

29. The wireless communication device of claim 22 further comprising a processor to generate a prompt for a user to provide additional information according to said contact information.

30. The wireless communication device of claim 29, wherein said processor prompt requests confirmation from said user before sending at least one of said notification messages.

31. The wireless communication device of claim 29, wherein said processor prompts said user to edit at least one of said notification messages before sending said notification messages.

32. The wireless communication device of claim 29, wherein said processor prompt requests a notification priority from said user for each said designated contact.

33. The wireless communication device of claim 29, wherein said processor directs said transmitter to defer sending said notification messages if said user does not provide said additional information during a predetermined wait period.

34. The wireless communication device of claim 29, wherein said processor directs said transmitter to send said notification messages if said user does not provide said additional information during a predetermined wait period.

35. The wireless communication device of claim 22 further comprising a keypad, wherein said emergency input comprises a defined key input entered on said keypad and detected by said wireless communication device.

36. The wireless communication device of claim 35 wherein said defined key input comprises 9-1-1.

37. The wireless communication device of claim 35 wherein said defined key input comprises a personal emergency code.

38. The wireless communication device of claim 22 further comprising an external input port, wherein said emergency input comprises an externally generated emergency signal received by said wireless communication device via said input port.

* * * * *